US009300952B2

(12) United States Patent
Neal (10) Patent No.: US 9,300,952 B2
(45) Date of Patent: *Mar. 29, 2016

(54) METHOD AND APPARATUS FOR VIEWING 3D VIDEO USING A STEREOSCOPIC VIEWING DEVICE

(71) Applicant: STMicroelectronics, Inc., Coppell, TX (US)

(72) Inventor: Greg Neal, Morgan Hill, CA (US)

(73) Assignee: STMicroelectronics, Inc., Coppell, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/255,357

(22) Filed: Apr. 17, 2014

(65) Prior Publication Data

US 2014/0225996 A1    Aug. 14, 2014

Related U.S. Application Data

(63) Continuation of application No. 12/972,177, filed on Dec. 17, 2010, now Pat. No. 8,736,673.

(60) Provisional application No. 61/291,538, filed on Dec. 31, 2009.

(51) Int. Cl.
*H04N 13/04* (2006.01)

(52) U.S. Cl.
CPC ....... *H04N 13/0497* (2013.01); *H04N 13/0438* (2013.01); *H04N 2213/008* (2013.01)

(58) Field of Classification Search
CPC .......... H04N 13/0497; H04N 13/0438; H04N 2213/008
See application file for complete search history.

(56) References Cited

U.S. PATENT DOCUMENTS

| 6,057,811 | A | 5/2000 | Edwards |
| 2001/0043266 | A1 | 11/2001 | Robinson et al. |
| 2006/0061652 | A1 | 3/2006 | Sato et al. |
| 2007/0164776 | A1 | 7/2007 | Chang et al. |
| 2007/0236493 | A1 | 10/2007 | Horiuchi et al. |
| 2007/0247508 | A1 | 10/2007 | Miura |
| 2009/0201362 | A1* | 8/2009 | Shestak .............. G02B 27/2264 348/56 |

\* cited by examiner

*Primary Examiner* — Joseph Ustaris
*Assistant Examiner* — Jill Sechser
(74) *Attorney, Agent, or Firm* — Seed IP Law Group PLLC (57) ABSTRACT

Methods and systems are described for enabling the operation of a stereoscopic viewing device such that the viewing device provides a movable viewing window that enables the 3D rendering of 3D image data displayed by a backlit LCD device. In a particular implementation, the systems and methods disclosed herein are operable to control the operation of a pair of LCD shutter glasses.

22 Claims, 7 Drawing Sheets

METHOD AND APPARATUS FOR VIEWING 3D VIDEO USING A STEREOSCOPIC VIEWING DEVICE

CROSS REFERENCE TO RELATED APPLICATIONS

This present application is a continuation of U.S. Pat. application Ser. No. 12/972,177, entitled "Method and Apparatus for Viewing 3D Video Using a Steroscopic Viewing Device," filed on Dec. 17, 2010, which claims priority to U.S. Provisional Patent application Ser. No. 61/291,538 filed on Dec. 31, 2009. Both applications are assigned to the assignee of the present application and are hereby incorporated by reference into the present application as if fully set forth herein.

TECHNICAL FIELD

The present invention relates generally to the operation of stereoscopic viewing systems and devices used to render 3D images.

BACKGROUND OF THE INVENTION

Currently, most viewing of three-dimensional (3D) image and video content is done using stereoscopic source image information viewed through so called "shutter glasses" of various types. In general, this means that the same source display (e.g., an LCD) displays right eye and left eye images in alternate succession over time. The use of shutter glasses enables the correct image to be viewed by the correct eye at the correct time to enable the illusion of 3D content.

However, one of the limitations of the technology is the length of time it takes various LCD pixels and systems to change state, either to generate new image frames or to adjust the shutter glasses. The "slow" response times of LCD pixels presents some challenges that have yet to be overcome.

During use a display is refreshed with the current data starting with data at the top and then working its way down to the bottom for each frame (in a process well known in the art as analogous to rater scanning). After each frame and a short vertical blanking period a new frame is presented in the same top to bottom manner.

However, in a stereoscopic display the alternate frames have left and right eye images. This fact results in some application difficulties. Because the time required for each pixel to change state can be a significant portion of the frame time, there is little or no time during a frame when all of the pixels are representative of one single frame. More commonly, each frame contains some of the previous frames data. Since in 3D viewing the stereoscopic data is presented in alternating left and right eye formats, this feature presents some limitations to the technology.

Due to this lag in frame data change there is typically little or no time during frame when all of the display pixels represent only one frame's image data. As a consequence there is little or no time during a frame when the shutter glasses can be "opened" to view either a left or right eye view. Accordingly, numerous artifacts and reductions in the quality of the image viewing experience are commonly encountered using this approach.

Accordingly, there is a need for approaches that avoid the aforementioned problem and provide improved image quality in an economic fashion. This disclosure addresses some of those needs.

SUMMARY OF THE INVENTION

In one aspect of the invention an integrated circuit (IC) system enables stereoscopic source 3D content to be viewed using a stereoscopic viewing device. The IC includes control circuitry configured to operate the viewing device in accordance with a time synchronized display technique configured to enable the selective advancing of a viewing window across a viewing field of the stereoscopic viewing device. The viewing window is configured such that it comprises a portion of the viewing field that is less than the entire viewing field. In some embodiments the controller can include receiver circuitry configured to receive timing information associated with a frame rate of the display device and synchronization circuitry configured to synchronize the frame rate of the display with a window advance period. In some implementations the integrated circuit chip system can be arranged on a single integrated circuit chip. In another implementation the chip can include a position sensor enabling the determination of at least one of position and orientation of the chip and a stereoscopic viewing device associated with the chip. Wherein the controller is configured to adjust a viewing device viewing window based information provided by the position sensor.

In another embodiment, the invention describes a stereoscopic viewing device enabling the 3-D rendering of images displayed on a video display device. One such device include a pair of eye pieces each with a viewing field configured to use a movable viewing window (that comprises a portion of the viewing field) in accordance with a time synchronized display technique that selectively advances the viewing window in association with the frame rate of the display. The display can also include a receiver configured to receive timing information associated with the display device. And a synchronizer configured to synchronize the timing of the display device with a window advance period. A viewing device can also include a position sensor and the controller being configured to adjust window position and size and motion based on position sensor information. The window height having a wide range of suitable heights and arranged in a movement pattern that may or may not have an overlapping window.

In another embodiment, a method of enabling stereoscopic viewing device to view 3D content with increased fidelity is described. In one embodiment a method includes operations of: receiving timing information from a from a display device including frame rate data associated with the image data of the display device; synchronizing eyepieces of a stereoscopic viewing device with the frame rate of the display device; generating a movable viewing window in the viewing field sized so that it comprises only a portion of the viewing field, advancing the movable viewing window across the viewing field of the stereoscopic viewing device in accordance with a time synchronized display technique that selectively advances the viewing window in synchronization with the frame rate of the display device; and arranging the movable viewing window such that only a portion of the image data presented by the display device is viewable through the movable viewing window thereby enabling the viewing of the image data presented by the display device as a 3D image. The method can be implemented as a set of computer executed instructions arranged on a non-transitory computer readable media which can include firmware. The method can be implemented as a set of computer executed instructions executed using the circuitry of a stereoscopic viewing device.

General aspects of the invention include, but are not limited to methods, systems, apparatus, and computer program products for enabling an enhanced viewing of 3D images using an improved stereoscopic viewing device.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF PREFERRED EMBODIMENTS

Reference is made to particular embodiments of the invention. While the invention will be described in conjunction with particular embodiments, it will be understood that it is not intended to limit the invention to the described embodiments. To the contrary, it is intended to cover alternatives, modifications, and equivalents as may be included within the spirit and scope of the invention as defined by the appended claims.

In particular the following description refers to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "stereoscopic" refers to displaying image pairs on a display device configured such that three-dimensional images can be viewed using special stereoscopic viewing devices such as headgear or glasses worn by a user or viewer. Examples, such as shutter glasses or polarized glasses can be used to view 3D images using a display device. Such systems and methods produce depth perception in the viewer even though the image is produced by a substantially 2D display device. Thus, 3D images can be perceived even though image content is produced by a flat screen display device.

By way of brief explanation, 3D content is displayed on a flat panel (or substantially flat) display as a pair of offset images. The image pairs are displayed individually in alternating frames which when viewed through a pair of shutter glasses can mimic parallax enabling the images to be perceived as three dimensional.

Figure 1:
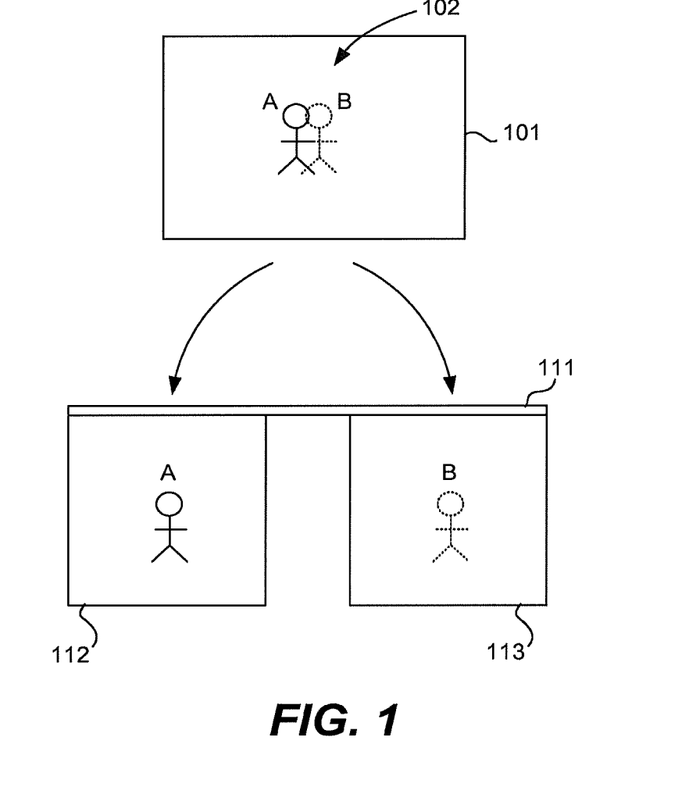
FIG. 1 illustrates an example of 3D image data as displayed on a 3D display and as viewing selectively by a stereoscopic viewing device.

FIG. 1 provides a simplified diagrammatic illustration of this process. The 3D content is displayed on display device 101 as an alternating pair of offset images 102 (image A and image B). The image pairs are displayed individually in alternating frames. A first frame shows image A, then a second frame shows image B, a third frame shows image A, and so on. This works similarly as the images move.

This image display pattern is intended to be viewed by an optical viewing system that selectively blocks one eye or the other in an alternating pattern. Shutter glasses are one such viewing device. The pattern of opening and closing the two shutters is synchronized with the alternating frames of the display. For example, when image A is shown the left shutter 112 of the glasses 111 is opened. Then in synchronization with the display, the left shutter 112 is closed, the right shutter 113 is opened, and image B is displayed. Offered in a continuous pattern of alternating frames and synchronized shutters the illusion of parallax is maintained resulting in the perception of a 3D image.

Figure 2A:
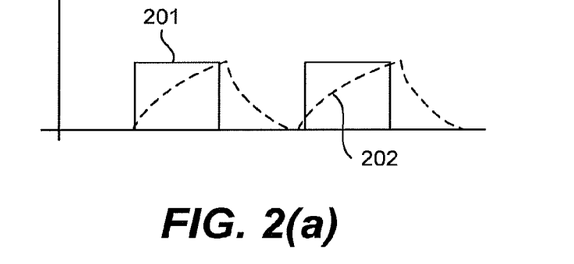
FIG. 2(a) diagrammatically illustrates an example response curve for a LCD element.

However, to display content in this way, twice as many images must be presented over a given time period. Systems commonly operating in the 120 Hz range and beyond. However, this high frame rate presents some difficulties for LCD type displays. LCD elements when switched on and off do not instantly activate. There is a certain gradual activation of the crystal elements of the LCD FIG. 2(a) is an illustration of a perfect response curve 201 where a display would switch on immediately, remain on for its display period, and then turn off. On contrast, response curve 202 describes the response of a typical LCD. The crystals of an LCD element do not immediately switch from transparent (white) to opaque (black), but rather slowly actuate, transitioning from white to black through a pattern of "grey scales" becoming darker and darker as time goes on until a "black" level is achieved. The converse is also true when changing from black to white.

Thus, a switched LCD element spends a non-trivial period of time transitioning through an intermediate grey period. Switching transition period on the order 8-16 milliseconds (ms) are common. In standard LCD displays this plays out as motion blur and several other undesirable artifacts. As the frame rate goes up, the problem becomes more pronounced.

Figure 2B:
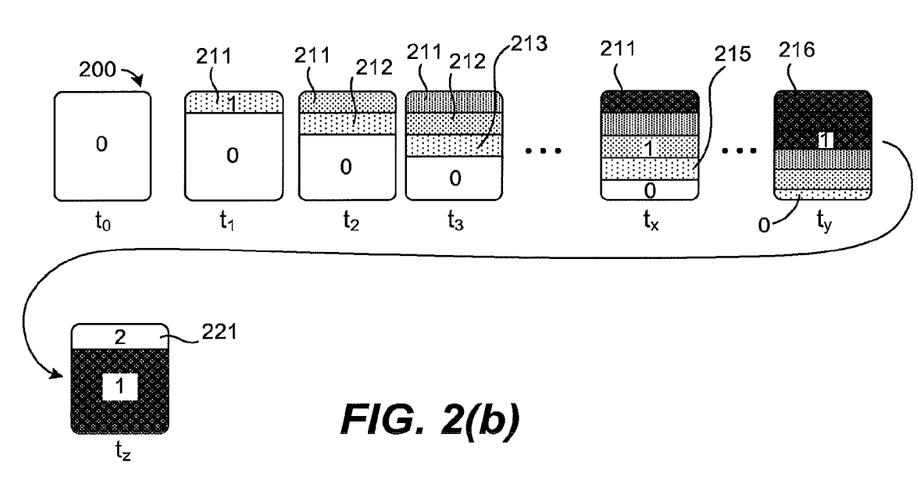
FIG. 2(b) diagrammatically illustrates response curve for an example LCD display device and the effect of the transition phases of the display LCD elements.

In the context of frame display this delay means that each frame is not displayed instantaneously as the image signal is received by the LCD screen, there is delay. FIG. 2(b) diagrammatically illustrates this process using an example LCD display 200. At time $t_0$, the display 200 displays image frame "0". For simplicity sake, in this example, frame "0" is a uniform "white" image and frame 1 will be a uniformly "black". Thus, at a next time period t1, a new frame period begins and the frame data begins entering the system. Typically, the data is written to the system grid by grid, starting at the top and progressing down the screen. For example, at time $t_1$ after $t_0$, frame 1 data is written to a first grid 211 of the LCD display. However, unlike a CRT (which is substantially instantaneous) the data is not full implemented at $t_1$. At $t_1$ the grid 211 is only beginning to activate its associated LCD elements. Accordingly, in this example, the first grid 211 is not completely "black". Instead it is only a "grey". In fact, in most modern LCD systems the first grid may only be 10% black having a black to white ratio of 10:90. As time goes on, e.g., at time $t_2$ after $t_1$, additional frame 1 data is written to a second grid 212 of the LCD display. Thus, at $t_2$ the grid 212 is only beginning to activate its associated LCD elements. However, the first grid 211 is further changing state and is darker. For example, the grid 211 may now be 20% black having ratio of 20:80. Whereas the newly actuated second grid 212 may only have a black to white ratio (BWR) of 10:90. As time further continues (e.g., at time $t_3$ after $t_2$) additional frame 1 data is written to a third grid 213 of the LCD display. Thus, analogous to the prior grids, at $t_3$ the grid 213 is only beginning to activate its associated LCD elements having a BWR of 10:90. Analogously, the second grid 212 is further changing state and is darker perhaps having a BWR of 20:80. Similarly, the first grid 211 darkens further and may now have a BWR 30:70. And so it will go. At some point (e.g., $t_x$) the top grid 211 will reach a fully actuated state becoming fully "black" having a BWR of 100:0. Additionally, the lower grids are darker and darker such that the most recently activated grid 215 is the lightest becoming progressively darker as the grids that have been activated longer become darker (i.e., the uppermost grids being darker than the lower ones). This continues until the entirely black grids 216 extend further and further down the display (for example at $t_y$).

Additionally, at some point (e.g., $t_z$) the LCD device 200 begins to receive new data associated with a next frame (e.g., frame 2). Accordingly, the top grid 221 begins transitioning to frame 2. Meanwhile the remaining grids continue being actuated as the new data extends down the screen.

It is specifically pointed out that that the simplified terms "black" and "white" are used only to illustrate the general principles of LCD pixel transition during actuation of pixel elements.

A problem with this arrangement is that when used with shutter glasses distortions and areas of "grey" are viewed because when the glass is opened not all of the grids are fully transitioned to their fully viewable state. Simply, the LCD cannot transition fast enough to rid the system from these artifacts.

However, this disclosure proposes a number of solutions to this problem. In general, this disclosure proposes that a pair of shutter glasses, instead of entirely opening a shutter at a same time, opening only selected portions of a shutter.

A pair of selectively actuatable shutter glasses can be synchronized with the frame rate of a LCD display device to present improved 3D viewing experience with far less artifact.

Reference is now made to FIGS. 3(a)-3(f) which presents a simplified pictographic depiction of an embodiment of the invention. In particular, the following discussion describes an embodiment of a time synchronized display technique that enable the selective advancing of a viewing window across a viewing field of a stereoscopic viewing device in accordance with an embodiment of the present invention. A LCD display device 301 is schematically represented. This invention is of particular use when employed with constant backlight systems. Such systems can include LED backlighting or CCFL (cold cathode fluorescent lamps) backlighting. Also pictographically represented are shutter glasses. In the interest of simplification only one eye piece of the shutter glass 302 is depicted. Each eye piece 302 includes a viewing field 303. The viewing field covers substantially all of the available viewing space of an eyepiece. The viewing field can be made opaque or opened for viewing. The viewing field 303 of an eyepiece can use an electrically activatable shutter to open or close the eyepiece. In one particular implementation the activatable shutter can comprise an array of electrically activatable elements that can be electrically activated or deactivated to make a portion of the viewing field opaque or partially transmissive (or even to change polarity) as needed. In one particular implementation, the electrically activatable elements can comprise LCD elements. Such can be an array of several elements (e.g., 8-10 elongate LCD elements arranged such that their long axis extends in a horizontal direction) or a large array of electrically activatable elements comprising, for example, a 16×16 array of LCD elements. In another advantageous configuration a large array of LCD elements comprising, for example, a 256×256 array of LCD elements can also be used. It is specifically pointed out that these disclosed embodiments are in no way intended to be limiting. Virtually any arrangement of LCD elements can be used. The only requirement being that the LCD elements can be selectively actuated such that a movable viewing window can be formed in the viewing field 303. This will be explained in greater detail in the following paragraphs.

Figure 3A:
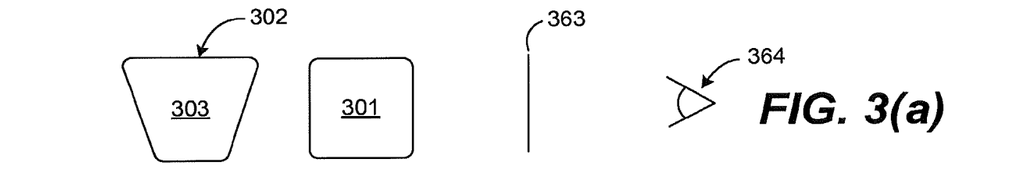
FIGS. 3(a)-3(f) diagrammatically illustrate the effect of a movable viewing window as applied to a stereoscopic viewing device in accordance with the principles of the present invention.

FIG. 3(a) is a schematic depiction of a side view 363 of the viewing field 303 which in this case is shown with the eye piece completely closed. Accordingly, the viewer 364 can not view the display 301 through the eyepiece.

The shutter glasses are configured to include a pair of optical shutters that define a viewing field (e.g., 303) for each shutter. These shutters are configured so that the electrically actuatable elements (e.g., LCD elements) can be selectively actuated to generate a movable viewing window that enables portions of the display to be viewed. The moveable window configured so that it can advance across the viewing field in accordance with a time synchronized display technique (described below) that selectively advances the viewing window. Additionally, the viewing window comprises a portion of the viewing field where that portion is smaller than the entire viewing field.

Figure 3B:
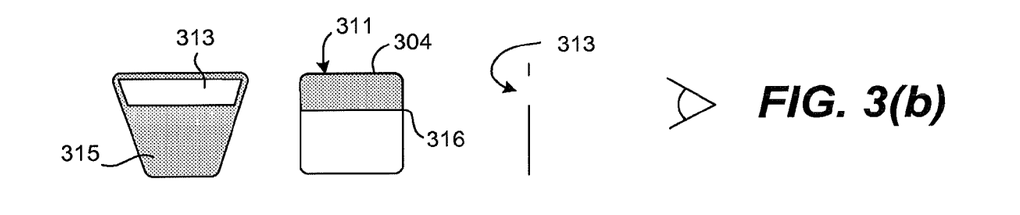

Referring now to FIG. 3(b), the display 311 is shown. In particular, a portion 304 of a displayed image representing the region of the image where the pixels are fully transitioned (e.g., where the BWR is 100:0 or in the opposite case where the pixels are transitioned to a BWR 0:100) is shown.

Also, a movable viewing window 313 is formed in the viewing field 315 of a first eyepiece 302 (i.e., the right or the left eyepiece) of a pair of shutter glasses. The movement of the movable window 313 is synchronized with that of the frame rate of the display. The window 313 is opened in a synchronized timing relationship with leading edge 316 of the fully transitioned pixels 304. For example, the window 313 is opened just before the fully transitioned pixels 304 reach a designated portion of the display screen. In some embodiments the window can be opened 1 ms before the designated portion of the display.

The window 313 can be generated by selectively actuating a portion of the electrically actuatable elements such that only the window 313 is substantially transparent. The other electrically actuatable elements maintained in an optically opaque configuration.

In this depicted embodiment, the window 313 can have a height of about ¼ the height as the height of the entire viewing field 315. It is to be noted that the window can have a greater vertical height or a lesser vertical height depending on the trade-offs desired by the designer. Smaller windows (windows of lesser vertical height) admit less light and are accordingly less bright. However, they also provide greater image resolution. Conversely, larger windows (windows of greater vertical height) admit more light and are brighter at the cost of reduced image resolution. Thus, the windows can be of any height, but it is believed that windows having a height of about ¼th to about ⅛$^{th}$ of the total viewing field height provide the best results.

Figure 3C:
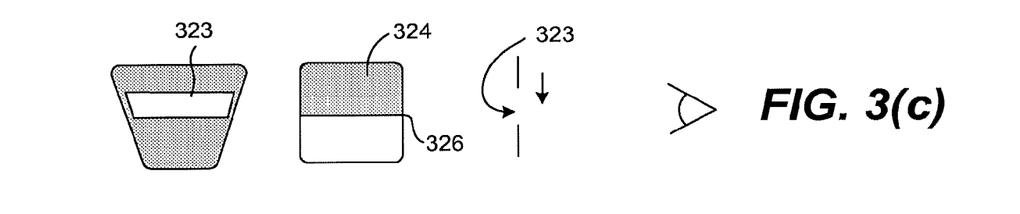

Continuing, FIG. 3(c), shows the relationship between the eyepiece (and movable window) and the display. Here, a portion 324 of a displayed image representing the region of the image where the pixels are fully transitioned (e.g., where the BWR is 100:0 or in the opposite case where the pixels are transitioned to a BWR 0:100) is shown. The leading edge 326 of this region is shown.

The movable viewing window 323 is shown moving downward across the viewing field 315 of the first eyepiece 302 (i.e., the right or the left eyepiece) of a pair of shutter glasses. As described before, the movement of the movable window 323 is synchronized with that of the frame rate of the display. The window 323 can be opened just before the leading edge 326 of the fully transitioned pixels 324 reach a designated portion of the display screen. Although in some embodiments the window can be opened 1 ms before the designated portion of the display, this timing can be altered to accomplish the needs of the designer. As before the window 323 can have a height of about ¼ the height as the height of the entire viewing field 315. It is to be noted that the window can have a greater vertical height or a lesser vertical height depending on the trade-offs desired by the designer. Additionally, the disclosure contemplates embodiments where the window is of variable height as it moves across the viewing field. As before the window 323 can be generated by selectively actuating a portion of the electrically actuatable elements such that only the window 323 is substantially transparent. The other electrically actuatable elements maintained in an optically opaque configuration.

Figure 3D:
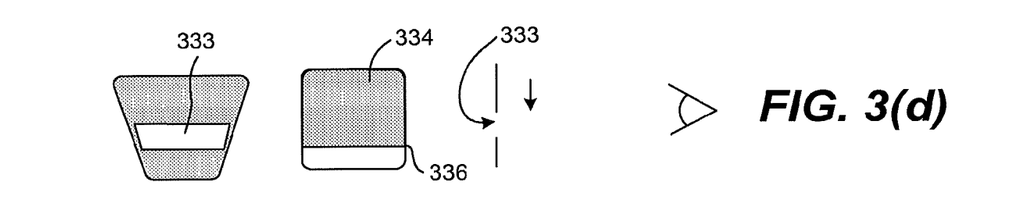

FIG. 3(d) shows the continuing relationship between the eyepiece (and movable window) and the display 301. Here, a portion 334 of a displayed image representing the region of the image where the pixels are fully transitioned is shown. The leading edge 336 of this region is shown.

The movable viewing window 333 is shown moving downward across the viewing field 315 of the first eyepiece 302 (i.e., the right or the left eyepiece) of a pair of shutter glasses. As described before, the movement of the movable window 333 is synchronized with that of the frame rate of the display. The window 323 is opened in a synchronized timing relationship with leading edge 316 of the fully transitioned pixels 314 of the display screen. As before the window can be opened 1 ms before the designated portion of the display, this timing can be altered to accomplish the needs of the designer. As before the window 333 can have a height comprising a selected portion of the entire viewing field 315.

Figure 3E:
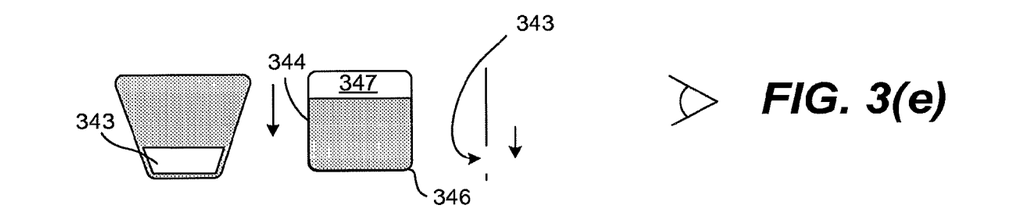

The process continues as shown FIG. 3(e) where the window 343 is shown advancing further across viewing field 315 in synchronization with the leading edge 346 of the fully transitioned pixels 344. Here, the leading edge 346 has reached the bottom and the next frames image data 347 is introduced to the display. At this point the data 347 of the next frame has not fully transitioned and the window 343 of the first eyepiece is still open at the bottom of the eyepiece.

Figure 3F:
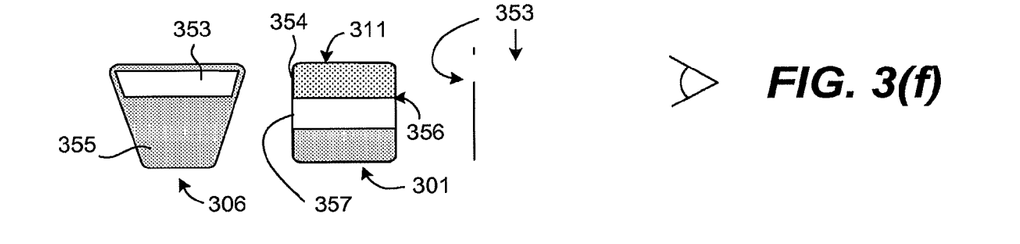

Referring now to FIG. 3(f), the display 311 continues to be shown. In particular, a portion 354 of a displayed second image frame that represents an initial region of the second frame where the pixels are fully transitioned (e.g., where the BWR is 100:0 or in the opposite case where the pixels are transitioned to a BWR 0:100). Portion 357 of the screen shows a portion of the second frame where the pixels have not yet fully transitioned.

Importantly, a movable viewing window 353 is formed in the viewing field 355 of a second eyepiece 306 (i.e., the other of the right or the left first eyepiece) of the pair of shutter glasses. FIG. 3(f) is simplified illustration of second eyepiece 306 and its relation to the display screen 301. As with the other eyepiece (e.g., 303), the movement of the movable window 353 of the second eyepiece 306 is also synchronized with that of the frame rate of the display. The window 353 is opened in a synchronized timing relationship with leading edge 356 of the fully transitioned pixels 354 of the second frame. Accordingly, in one embodiment, the window 353 is opened just before the fully transitioned pixels 304 reach a designated portion of the display screen. In some embodiments the window can be opened 1 ms before the designated portion of the display. It is pointed out that the window can actually be opened at anytime (i.e., greater than 1 ms before or just shortly after the leading edge of the image), but just before the leading edge enters the view of the window is advantageous because it allows an LCD actuated shutter adequate transition time to become fully open when the portion of the image becomes transitioned.

Thus the window scrolls down the eyepieces (313, 323, 333, 343, 353, etc.) in synchronization with the frame rate of the images data sent to the display screen. For example, a 120 Hz display signal is generally accompanied with 120 Hz window advancement rate on the shutter glasses. There can be an offset in the timing of the window advance rate to accommodate the small amount of time required to open and shut the windows as is needed.

Figure 4:
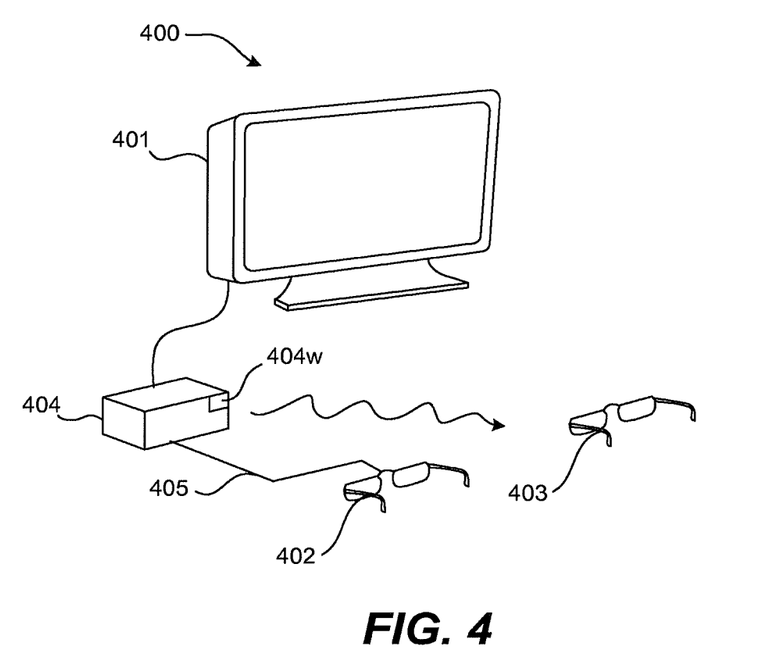
FIG. 4 diagrammatically illustrates an example system including a 3D backlit LCD display device and a stereoscopic viewing device in accordance with the principles of the present invention.

FIG. 4 is high level figurative illustration of an embodiment of a system 400 using the improved shutter glasses devices disclosed herein. A display device 401 is any display device capable of displaying 3D content. This can be a television set, a computer display, or any of the many different devices capable of displaying 3D content. This invention is of particular utility when employed in systems 400 having a constant backlit display device. Particularly a constant backlit LCD display. Such systems can include, but are not limited to LED or CCFL constant backlit display devices.

In the depicted embodiment viewing devices 402, 403 of a type described herein are used. Two such devices 402, 403 are illustrated here. It should be pointed out that any number of such devices can be employed (from one device to many devices). These devices can be controlled using a number of means. Here, a controller 404 is shown. The controller 404 is configured to interface the devices 402, 403 with the display device 401. The controller 404 enables timing information from the display 401 to be transmitted to the viewing devices 402, 403. Additionally, in many of the embodiments described herein (as well as others) it can be important for the viewing devices to communicate information back to the display and/or controller. The controller 404 can be integrated into the display device 401 or operated as a separate device enabling it to be connected with a number of different displays as desired. The controller 404 can communicate with the viewing devices (e.g., 402) using a direct physical link 405 between controller 404 and viewing device 402. The direct physical link 405 can be any sort of physical link such as an optical connector or an electrical connector.

Alternatively, or additionally, the controller 404 can include a wireless transmitter 404w that can communicate wirelessly with a viewing device 402 having a wireless receiver. Such wireless communication can facilitated using radio, microwave, optical (particularly infrared (IR)) signals. However, it is pointed out that such wireless communication is not limited to these modes and can comprise virtually any applicable use of the electromagnetic spectrum to carry information between the controller 404 and the viewing device 403.

It is also pointed out that in some cases the controller can be implemented as part of the viewing devices 402, 403 with a transceiver that enables communication with the display device 401 using, for example, wireless or physical data communication between display and viewing devices.

With continued reference to FIGS. 3 & 4 and particularly FIG. 5(a)-5(d) a few approaches for implementing time synchronized display techniques that enable the selective advancing of a viewing window across a viewing field of the stereoscopic viewing device.

Figure 5A:
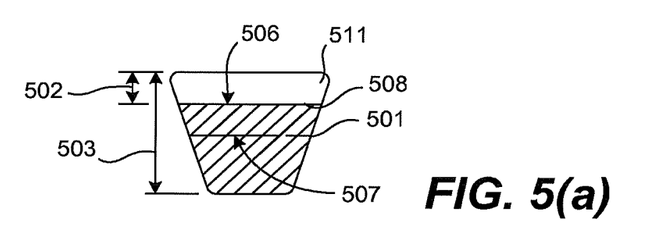
FIGS. 5(a)-5(d) are diagrammatic depictions of an overlapping window implementation of the movable viewing window in accordance with one embodiment of the present invention.
Figure 5B:
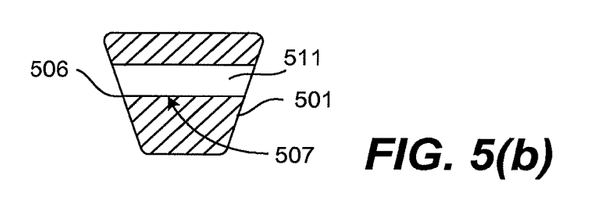

FIG. 5(a)-5(d) provides illustrations of an eyepiece 501 operated in accord with embodiments of the invention. In FIGS. 5(a)-5(b), the eyepiece 501 is configured with a movable viewing window 511 open at the top of the eyepiece 501. In this particular example, the movable viewing window 511 has a height 502 that is about $\frac{1}{4}^{th}$ the height 503 of the entire viewing field. In the uppermost position, the leading edge 506 of the window lies about a quarter 508 of the way down the viewing field. Using the time synchronized display technique, at the appropriate time, the window 511 is advanced down the viewing field in synchronization with the frame rate of the display device. For example, at some later time the window 511 is advanced downward such that its leading edge 507 reaches a next quarter 507 of the viewing field. This advancement continues as a series of four "jumps" (one quarter of the viewing field each) until the bottom is reached and then the process begins anew in the other eyepiece. This much as described in the FIG. 3 series of drawings. This can be quite advantageous when the eyepiece 501 is configured with four LCD panels with each panel comprising one quarter of the vertical height of the viewing field. There can, of course, be many such panels. However, simple embodiments with fewer panels of electrically activatable elements (LCD elements) can be more inexpensive to make and implement.

It is to be noted that the window 511 size can be smaller (or larger) which will require more jumps of smaller size. For example, a window height of only $\frac{1}{8}^{th}$ of the viewing field height can use eight jumps of smaller increments, and so on. Also, in such an embodiment panels of only 8 electrically activatable elements can be used.

Figure 5C:
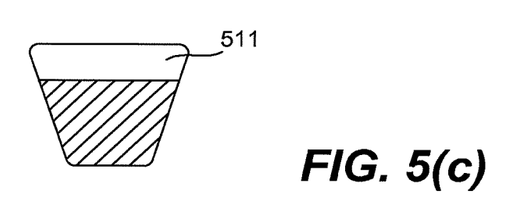
Figure 5D:
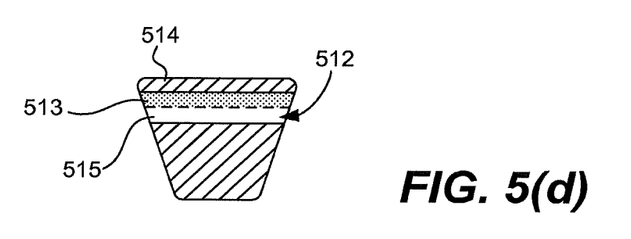

In another approach as illustrated using FIGS. 5(c)-5(d) an overlapping progression of the window 511 down the viewing field can be advantageous. Here, the movable viewing window 511 begins substantially the same way it does in FIG. 5(a). In FIG. 5(a), the window at first position closes and a new window at a next position below the first position opens. There is no overlap between the first position and second position.

Here, in this embodiment, when the window advances, it advances only a portion of the way down the viewing field. Thus, as the window 512 moves downward a portion of the window (portion 513) is still open in a portion that was formerly occupied by window 511. In this embodiment, the window advances one half of a window height instead of an entire window height. In such a case, the window advances twice as often, but moves half as far. In this implementation, a portion of the viewing field 514 that corresponds to the upper half of window 511 is closed. Also, a portion of the viewing field 515 below the window 511 opens thereby creating a moved viewing window 512. In this way, the window can move down the viewing field in a series of overlapping steps. It should be pointed out that the movement of the window down the viewing field can progress in smaller and smaller increments limited only by the number of vertical pixels (electrically actuatable elements (e.g., LCD's)) of the eyepiece. In embodiments having many such pixels (e.g., the 256×256 LCD array) the movement of the window can seem nearly continuous if desired with each movement overlapping substantially all of the foregoing window. Thus, the degree of overlap can be highly variable and is left to the user as an implementation detail. And also as mentioned before, the window size can also be varied if desired.

On another embodiment of the invention, a motion and/or position sensor can be used to detect the orientation and/or distance the viewing device (e.g., 402, 403). In particular, a detector can be configured to detect the orientation and/or distance the viewing device relative to the display device 401. This information can be used to adjust the movable viewing window based on the position of the viewing device. The height of the window could be increased of decrease depending on distance. In one example, the height of the window could be increased as the viewing device becomes closer to the display device. Many other distance related possibilities can also be implemented. Additionally, and importantly as the user tilts his or her head a certain amount of distortion can occur as the viewing window of the viewing device is oriented at an angle relative to the display screen. For the very best results the elongate movable viewing window (e.g., 313, 511, and so on) should be oriented so that the long axis extends in a substantially horizontal direction. Thus, as the head (and the also the viewing device is tilted, rotated, or otherwise moved, the viewing window adjusts. For example, if the user were to tilt his head to the side the window would adjust to compensate for this. In another example, if the user were to look down, the window can move upward to compensate for the change in orientation.

Figure 6A:
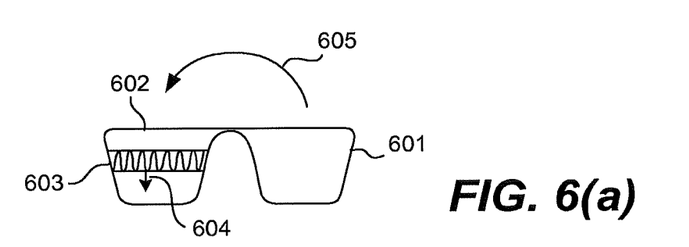
FIGS. 6(a)-6(b) are diagrammatic depictions of a stereoscopic viewing device when tilted in accordance with one embodiment of the present invention.
Figure 6B:
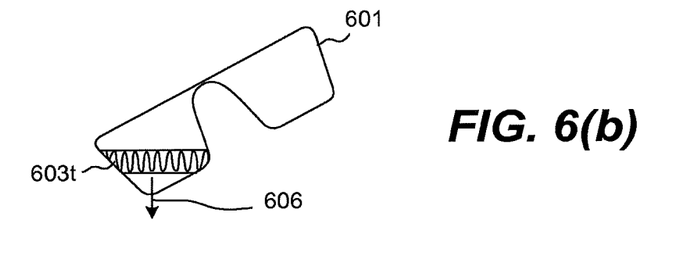

FIGS. 6(a)-6(b) can be used to illustrate this principle. In one particularly useful embodiment a viewing device having an array of electrically actuatable elements is very useful. Many types of such arrays can be employed. By way of non-limiting example, a 256×256 array of LCD elements can be used in each eyepiece. The invention is not limited to this size or type of array. FIG. 6(a) depicts a viewing device with the left eyepiece 602 having a movable viewing window 603 moving across 604 the view field in accord with the general principles of the invention.

As the user tilts his head the viewing device tilts 605 as well. As shown in FIG. 6(b), in order to maintain a substantially horizontal orientation of the movable viewing window 603, the window rotates to generate a rotated movable window 603t which continues to move downward 606 in a substantially vertical fashion. Thus, position information can used to orient the movable window and its direction of movement based on the orientation of the viewing device 601. This approach is very much enhanced through the use of viewing devices having two dimensional arrays of electrically actuatable elements. For example, a 16×16 LCD array can provide acceptable results. The results become even better when arrays of more LCD's are used. Excellent results can be obtained using a 256×256 array of LCD elements.

Figure 7:
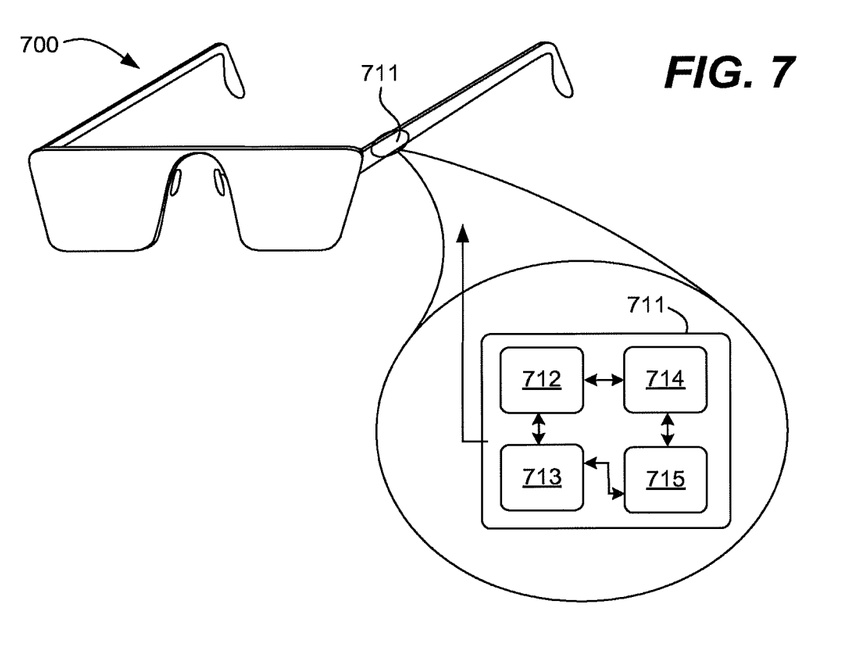
FIG. 7 is a diagrammatic block diagram showing various components and modules of a specific configuration of an embodiment of a stereoscopic viewing device in accordance with one embodiment of the present invention.

FIG. 7 is a system diagram of a system 700 embodiment comprising a viewing device and supporting circuitry. The device comprises a stereoscopic viewing device comprising a pair of eye pieces 701, 702 generally supported in a frame with each eyepiece having a viewing field comprised of a plurality of electrically actuatable elements. Each of the elements capable of selectively becoming opaque or optically transmissive (for example, when activated or not activated). In one implementation the device includes a plurality of LCD's arranged in each eyepiece. In one example, an array of 16×16 LCD elements can comprise each eyepiece to form a pair of viewing fields 703. As before, such a configuration is intended to be an example and is not intended to limit the scope of the invention with the array and viewing fields capable of many different size and shape configurations as well as number and type of electrically actuatable elements.

The system being configured such that the electrically actuatable elements are capable of generating the movable viewing window (e.g., 704) described herein.

The system further includes a control system 711 that enables the control a stereoscopic viewing device to enable 3-D rendering of images (particularly image pairs) displayed on a video display device. As indicated before, particular utility of this system is found using constant backlit display devices.

The controller can be integral to the stereoscopic viewing device and comprises a system of control circuitry configured to operate the stereoscopic viewing device in accordance with the time synchronized display techniques described in this disclosure. Accordingly, the controller 711 enables the selective advancing of a viewing window across a viewing field such the viewing window comprises a portion of the viewing field that is less than the entire viewing field. In one embodiment the controller and all of its elements can comprise integrated circuitry comprising one or more computer chips. In one particularly desirable implementation the entire controller 711 is embodied in a single system on a chip (SOC) configuration.

The controller 711 is configured to enable communication between controller 711 and the eyepieces 703, 704 and is configured to control the viewing field s 703 and the movable viewing windows 704.

The controller 711 can include a receiver (and/or transceiver) 712 configured to receive input from the display device such that the input includes timing information associated with a frame rate of the display device. Such can be a wireless receiver (and/or transceiver) or a physical link including an interface to the display device.

The controller 711 includes synchronization circuitry 713 configured to synchronize the frame rate of the display device with a window advance period. Accordingly, the synchronization circuitry 713 enables the window 704 movement to be synchronized with frame rate of the display device.

Additionally, and optionally, the controller 711 can include a position sensor 714 and position sensor control system 715 suitable for determining at least one of position and orientation of a stereoscopic viewing device. The sensor and associated circuitry is configured to enable the determination of at least one of distance of the viewing device 700 from the display device and/or the pitch, roll, and yaw orientations of the viewing device 700. The position sensor control system 715 is configured to enable the adjustment of the viewing window 704 based on said distance and orientation information provided by the position sensor. It is to be pointed out that there are many electronic systems capable of determining position and orientation and also processing this information to alter at least one of window 704 orientation and size depending on said information.

Figure 8:
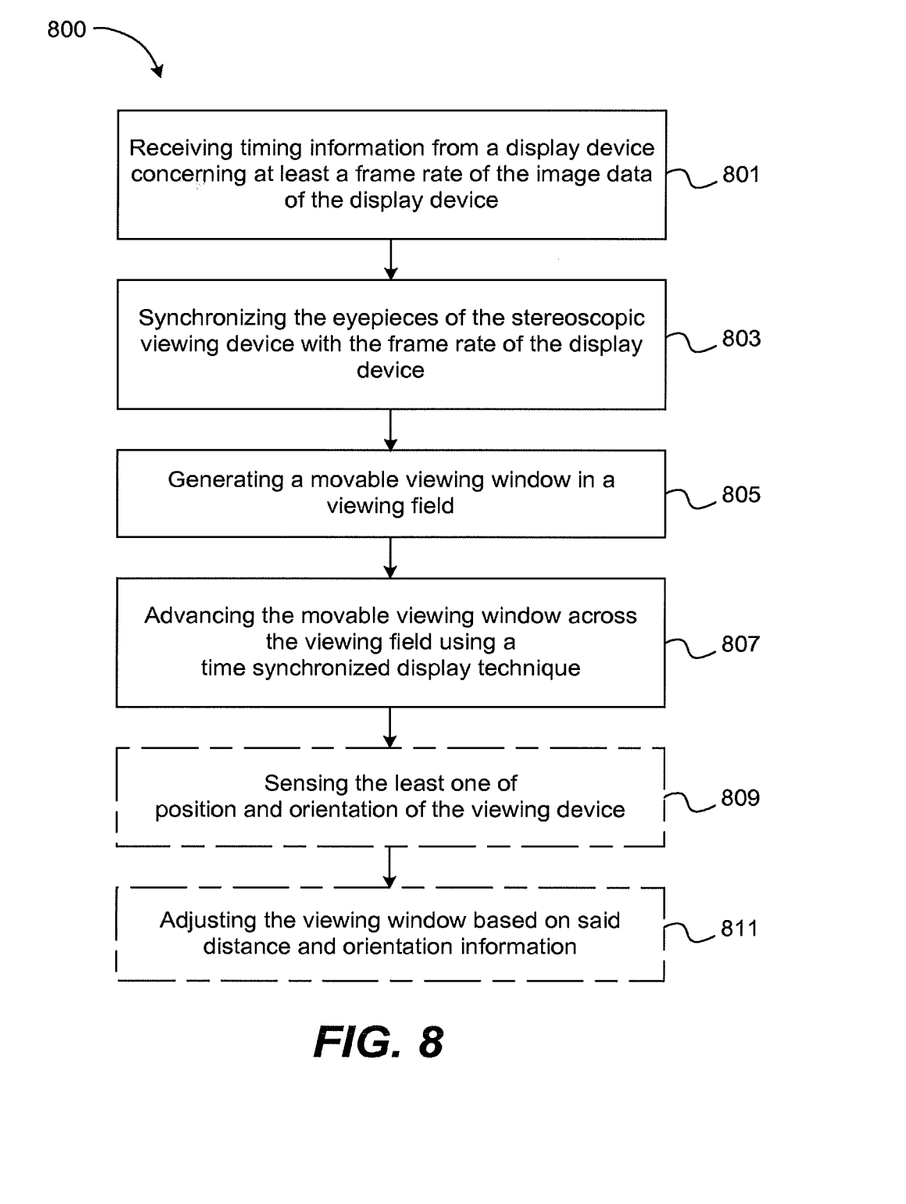
FIG. 8 is a flow diagram illustrating one approach for enabling more realistic 3D display of image frames using a stereoscopic viewing device in accordance with the principles of the present invention.

FIG. 8 is a flow diagram that describes one example method implementation of enabling stereoscopic source 3D content to be viewed by a 3D viewing device of a type disclosed herein.

In one method 800 embodiment a stereoscopic 3D viewing device is operable to receive timing information from a from a display device characterizing a frame rate of the image data of the display device (Step 801). As indicated above, the method finds particular utility when used with constant backlit LCD display devices.

The device uses this information to synchronize the eyepieces of the stereoscopic viewing device with the frame rate of the display device (Step 803).

As each eyepiece comprise a viewing field, a movable viewing window is formed in a selected one of the viewing field where the window is sized such that it is smaller than the entire viewing field (Step 805). Accordingly, the window comprises only a portion of the viewing field. The movable viewing window is arranged so that only a portion of the image data presented by the display device is viewable through the movable viewing window thereby enabling the viewing of the image data presented by the display device as a 3D image.

The movable viewing window is advanced across the viewing field of the stereoscopic viewing device in accordance with the time synchronized display techniques disclose herein (Step 807). In operation the window is selectively advanced in synchronization with the frame rate of the display device.

In the following optional steps, orientation and distance information can be used to adjust window operation, orientation, and movement.

Accordingly, at least one of position and orientation of the viewing device is sensed (Step 809). Among the information sensed can be distance of the viewing device from the display device as well the pitch, roll, and yaw orientations of the viewing device.

Also this information can be used to make adjustments in the viewing device. Accordingly, the viewing window is adjusted based on said distance and orientation information sensed (Step 811).

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents.

What is claimed is:

1. An integrated circuit chip system for controlling a viewing device for 3-D rendering of images displayed on a video display device, the integrated circuit chip system comprising:
   a controller configured to advance a viewing window across an eyepiece of a viewing device in synchronization with display of a 3D image on a video display device, wherein the viewing window comprises a portion of the eyepiece, the portion being less than the entire eyepiece, and only a portion of the video display device is viewable through the viewing window.

2. The integrated circuit chip system of claim 1, further comprising,
   a receiver configured to receive input from the video display device, the input including timing information associated with a frame rate of the video display device; and
   synchronization circuitry configured to synchronize an advance period of the viewing window with the frame rate of the video display device.

3. The integrated circuit chip system of claim 1, wherein the integrated circuit chip system is arranged on a single integrated circuit chip.

4. The integrated circuit chip system of claim 1, wherein the integrated circuit chip system is integrated into the viewing device.

5. The integrated circuit chip system of claim 2, further comprising,
   a position sensor configured to determine position information relating to the viewing device, the position information including at least one of (i) a distance of the viewing device system from the display device and (ii) a pitch orientation, a roll orientation, and a yaw orientation of the viewing device; and
   wherein the controller is configured to adjust the viewing window based on the position information.

6. The integrated circuit chip system of claim 1, wherein the viewing window has a height in the range of about $1/4^{th}$ to about $1/16^{th}$ of a height of the eyepiece.

7. The integrated circuit chip system of claim 6, wherein at least one viewing window overlaps a portion of an immediately preceding viewing window.

8. The integrated circuit chip system of claim 6, wherein the controller is configured to form the viewing window by selectively actuating LCD elements that form the eyepiece of the viewing device.

9. A viewing device for use in 3-D rendering of images displayed on a video display device, the viewing device comprising:
   an eyepiece through which a user may view a video display device; and
   a controller configured to advance a viewing window across the eyepiece in synchronization with display of a 3D image on the video display device, wherein the viewing window comprises a portion of the eyepiece, the portion being less than the entire eyepiece, and only a portion of the video display device is viewable through the viewing window.

10. The viewing device of claim 9, further comprising:
    a receiver configured to receive input from the video display the input including timing information associated with a frame rate of the display device; and
    synchronization circuitry configured to synchronize an advance period of the viewing window with the frame rate of the display.

11. The viewing device of claim 10, further comprising:
    a position sensor configured to determine position information relating to the viewing device, the position information including at least one of (i) a distance of the viewing device system from the display device and (ii) a pitch orientation, a roll orientation, and a yaw orientation of the viewing device; and
    wherein the controller is configured to adjust the viewing window based on the position information.

12. The viewing device of claim 9, wherein the viewing window has a height in the range of about $1/4^{th}$ to about $1/16^{th}$ of a height of the eyepiece.

13. The viewing device of claim 12, wherein the height of the viewing window is in the range of about $1/4^{th}$ to about $1/8^{th}$ of the height of the eyepiece.

14. The stereoscopic viewing device of claim 9, wherein at least one viewing window overlaps a portion of an immediately preceding viewing window.

15. The stereoscopic viewing device of claim 9, wherein the controller is configured to form the viewing window by selectively actuating LCD elements that form the eyepiece of the viewing device.

16. The stereoscopic viewing device of claim 15, wherein the eyepiece of the viewing device comprises one of a 16×16 array of LCD elements and a 256×256 array of LCD elements.

17. A method for 3-D rendering of images displayed on a video display device, the method comprising:
    receiving timing information from a video display device, the timing information associated with a frame rate of the video display device;
    generating a viewing window in an eyepiece of a viewing device, the viewing window comprising a portion of the eyepiece, wherein the portion is less than the entire eyepiece;
    advancing the viewing window across the eyepiece in synchronization with the frame rate of the display device; and
    controlling a position of the viewing window to allow viewing of only a portion of the video display device through the viewing window.

18. The method of claim 17, further comprising:
    sensing position information relating to the viewing device, the position information including at least one of (i) a distance of the viewing device system from the display device and (ii) a pitch orientation, a roll orientation, and a yaw orientation of the viewing device; and
    adjusting the viewing window based on the position information.

19. The method of claim 17, wherein the viewing window has a height in the range of about $1/4^{th}$ to about $1/16^{th}$ of a height of the eyepiece.

20. The method of claim 17, wherein at least one viewing window overlaps a portion of an immediately preceding viewing window.

21. The method of claim 17, wherein generating a viewing window comprises selectively actuating LCD elements that form the eyepiece of the viewing device.

22. Computer implementable instructions arranged on a non-transitory computer readable medium, the instructions for 3-D rendering of images displayed on a video display device, the instructions operable to control a viewing device and comprising instructions to:
    receive timing information from a video display device, the timing information associated with a frame rate of the video display device;

generate a viewing window in an eyepiece of a viewing device, the viewing window comprising a portion of the eyepiece, wherein the portion is less than the entire eyepiece;

advance the viewing window across the eyepiece in synchronization with the frame rate of the display device; and control a position of the viewing window to allow viewing of only a portion of the video display device through the viewing window.

* * * * *